(12) United States Patent
Tigerfeldt

(10) Patent No.: US 9,023,444 B2
(45) Date of Patent: May 5, 2015

(54) THERMAL INSULATING MATERIAL

(75) Inventor: Staffan Tigerfeldt, Helsingborg (SE)

(73) Assignee: Saint-Gobain Isover, Courbevoie (FR)

( * ) Notice: Subject to any disclaimer, the term of this patent is extended or adjusted under 35 U.S.C. 154(b) by 1562 days.

(21) Appl. No.: 11/587,184

(22) PCT Filed: Apr. 20, 2005

(86) PCT No.: PCT/FR2005/050262
§ 371 (c)(1),
(2), (4) Date: Apr. 18, 2007

(87) PCT Pub. No.: WO2005/105430
PCT Pub. Date: Nov. 10, 2005

(65) Prior Publication Data
US 2007/0178283 A1  Aug. 2, 2007

(30) Foreign Application Priority Data

Apr. 23, 2004 (SE) ...................... 0401043

(51) Int. Cl.
  *B32B 15/08* (2006.01)
  *F24F 13/02* (2006.01)
  *F16L 59/02* (2006.01)
  *F16L 59/08* (2006.01)

(52) U.S. Cl.
  CPC ............. *F24F 13/0263* (2013.01); *B32B 15/08* (2013.01); *F16L 59/029* (2013.01); *F16L 59/08* (2013.01); *F24F 13/0281* (2013.01); *F24F 2221/30* (2013.01)

(58) Field of Classification Search
  CPC .... B32B 15/08; F16L 15/029; F24F 13/0263; F24F 13/0281
  USPC ........ 428/36.9, 34.1, 156, 194; 138/147, 149; 156/60
  See application file for complete search history.

(56) References Cited

U.S. PATENT DOCUMENTS

| 1,838,242 | A | * | 12/1931 | Wilson .......................... 138/115 |
| 3,826,862 | A |   | 7/1974  | Chiba et al. |
| 3,837,992 | A |   | 9/1974  | Sherman et al. |
| 4,271,218 | A |   | 6/1981  | Heckel et al. |
| 4,447,490 | A |   | 5/1984  | Ventker et al. |

(Continued)

FOREIGN PATENT DOCUMENTS

| DE | 44 10 558 | 9/1995 |
| EP | 0 394 117 | 10/1990 |

(Continued)

OTHER PUBLICATIONS

Translation of WO 03/008854 Mar. 2003.*

(Continued)

*Primary Examiner* — Erik Kashnikow
(74) *Attorney, Agent, or Firm* — Oblon, McClelland, Maier & Neustadt, L.L.P.

(57) ABSTRACT

A coating material in laminate form, intended for an insulation system for installation elements such as pipes, containers, and ventilation ducts. The insulation system includes a surface that the coating material must cover. The coating material has an outer, first layer made of metal foil, for example an aluminum foil, having a thickness within the 20 to 100 mm and more preferably 30 to 60 mm range, together with a plastic layer placed between the metal foil first layer and the surface of the insulation system.

22 Claims, 1 Drawing Sheet

(56) References Cited

U.S. PATENT DOCUMENTS

| | | | |
|---|---|---|---|
| 5,322,721 | A | 6/1994 | McGinnis, Jr. et al. |
| 5,702,994 | A | 12/1997 | Klosel |
| 6,177,516 | B1 * | 1/2001 | Hudak ............................ 525/71 |
| 6,635,322 | B1 | 10/2003 | Korsgaard |
| 2004/0258865 | A1 | 12/2004 | Jessen et al. |

FOREIGN PATENT DOCUMENTS

| | | |
|---|---|---|
| GB | 2 108 046 | 5/1983 |
| GB | 2 336 565 | 10/1999 |
| WO | 95 13915 | 5/1995 |
| WO | 96 37728 | 11/1996 |
| WO | 02/055801 | 7/2002 |
| WO | 03.008854 | 1/2003 |

OTHER PUBLICATIONS

Machine Translation of DE 44 10 558 Sep. 1995.*
Decision on Maintaining a Patent in Amended Form issued in Opposition to corresponding Swedish Patent No. 0401043-5, dated Mar. 29, 2010, pp. 1-5.
Appeal of Decision in Opposition to corresponding Swedish Patent No. 0401043-5, dated May 26, 2010, pp. 1-16.
English-language translation of Response to Official Notice dated Nov. 10, 2010 filed in corresponding Swedish Patent Application No. 0401043-5 (SE 527 024), 9 pp.
English-language translation of Decision on Maintaining a Patent in Amended Form dated Mar. 29, 2010 in corresponding Swedish Patent Application No. 0401043-5 (SE 527 024), pp. 1-5 and claim pp. 13-15.
Ullman's Encyclopedia of Industrial Chemistry, vol. A20, p. 494, 1992.
http://en.wikipedia.org/wiki/polyester, 2010.
Data sheet from Tscheulin-Rothal dated 1988.
Data sheet from Tscheullin-Rothal dated 1990.
http://en.wikipedia.org/wiki/polyethylene_terephtalate, 2010.
American Society for Testing and Materials, Standard Test Method of Softening Point of Bitumen (Ring-and-Ball Apparatus)1, Designation: 36-95, 2010.

* cited by examiner

THERMAL INSULATING MATERIAL

CROSS REFERENCE TO RELATED APPLICATIONS

This application is the U.S. National Stage of International Application No. PCT/FRO5/050262, filed Apr. 20, 2005. This application claims priority to Swedish Patent Application No. 0401043-5, filed Apr. 23, 2004.

BACKGROUND

The invention relates to a coating material in laminate form intended in insulation systems for installation elements such as pipes, containers and ventilation ducts. The invention also relates to an insulation system comprising such a coating material.

In the technical fields of buildings and processes, it is common practice to insulate, for example, pipes and containers. The insulation may be provided in shell form, for pipes, or in the form of panels or mats. A typical insulation is made up of a thermally insulating material, such as mineral wool, which, on its side turned toward the external environment, is provided with a protective outer layer made of plastic, paper or metal, and laminated onto said material. The protective outer layer conventionally has a very small thickness. When this consists of aluminum, the thickness is around 18 µm, which is regarded as the lower limit for an aluminum foil resistant to diffusion. This small thickness means that the outer layer is, however, subject to mechanical damage which may occur, for example, during fitting or maintenance. One standard way of increasing its strength is to provide the outer layer with a reinforcement, for example glass fibers embedded in the outer layer. However, such reinforcement is insufficient to give the outer layer of the insulation the required mechanical properties. Good mechanical properties are important, for example, as regards maintenance, insofar as the insulating surface may, in many cases, be the only support surface available, for example for a ladder. The mechanical properties are also important in confined spaces where there is a substantial risk of a person knocking against the outer layer and damaging it.

In cases where the insulations described above consist of a pipe shell, said shell has, for fitting reasons, a slit which allows it be easily opened and fitted over a pipe. The slit is then sealed by means of a band of adhesive tape for example, just like the joints between the adjacent elements. Examples of such pipe shells and the way they are fitted are indicated for example in document U.S. Pat. No. 4,606,957. In the case in which mats are used, a corresponding sealing operation is performed by means of an adhesive tape or a sheet provided with adhesive.

When such sealing is considered as being insufficient, the insulation may, in accordance with document EP 0 308 191, be provided with adhesion-promoting surfaces in combination with an adhesive tape adapted for this purpose.

To increase the mechanical properties while ensuring satisfactory sealing, it is very commonly appropriate to supplement such insulations during fitting with an outer shell. This shell may for example consist of molded, plastic or metal, coverings that are rigid, but always flexible. The joints that are formed between the coverings are sealed for example by means of an adhesive tape or a sheet of the same type of material as the coverings. In the case in which the insulation takes place on surfaces exposed to condensation, a condensation-impervious means must be placed inside such a covering.

It should be noted that the work undertaken by the person carrying out the sealing operation is demanding, in order to provide a satisfactory result. In many cases, the work is complicated, partly because the pipes and the containers are often of complex shape and extent and partly because accessibility is often limited. In addition, the quality of the adhesion during on-site fitting and operation is often insufficient because of the salty or humid environment.

The metal coverings used, for example those available under the brand name ALUPAK®, or in general those termed "stucco sheet", are formed from pure aluminum with a thickness of 0.1–0.2 mm, which is pressed to the desired shape. There is a manifest risk of causing damage during handling by cuts. In addition, the tear strength is insufficient. The use of coverings made of plastic, available for example under the brand name Isogenopak®, are less advantageous from the standpoint of fire resistance.

The technique described here is the same whether the surfaces are cold surfaces, exposed to condensation, or are hot surfaces, not exposed to condensation.

An estimate in this sector of activity indicates that about 90 to 95% of all insulations are combined with a separate outer layer in covering form, for example as described above. Consequently, this means that in this case there is twice the amount of fitting work, which is expensive and time-consuming, and entails a high risk of surface defects or even integral defects.

SUMMARY

It is an object of the present invention to provide a coating material in laminate form, which has mechanical properties, in particular tear strength, impact resistance and penetration resistance, such that it can withstand normal handling during the fitting and maintenance operations and also the normal stresses during the lifetime of the insulation.

The coating material should also be simple and inexpensive to manufacture.

Another object is to provide a coating material that conforms to the regulations in force in terms of fire resistance, for example "outer layer of class 1", in accordance with SS 02 48 23/NORDTEST-FIRE 004.

Yet another object is to ensure that the coating material can be applied to an insulation system during its production so as to form a unit integrated into the existing production equipment with possible minor modifications. The coating material should however also be able to be used during the fitting operation, away from the production line.

Yet another object is to ensure that the insulation system comprising such a coating material can be fitted directly on site without additional layers in the form of separate coverings for example.

To achieve the objects indicated above and other objects not mentioned, the present invention relates to a coating material and to an insulation system comprising such a coating material that have the features indicated in the independent claims. Preferred embodiments of the coating material and of the insulation system will be apparent from the dependent claims.

More precisely, the invention relates to a coating material in laminate form, intended in an insulation system for installation elements such as pipes, containers and ventilation ducts, which insulation system has a surface that the coating material must cover. The coating material is characterized by an outer, first layer made of metal foil, for example an aluminum foil, having a thickness within the 20 to 100 µm and more preferably 30 to 60 µm range, together with a plastic layer placed between the metal foil first layer and the surface of the insulation system. Such a coating material, despite its small thickness, is very flexible and easy to handle, while still having mechanical properties, in particular tear strength, impact resistance and penetration resistance, such that it can withstand, without any problem, normal handling during the fitting and maintenance operations, and also the normal stresses during the lifetime of the insulation. These properties are obtained without using external protective coverings. Despite its small thickness, it is also resistant to the mechanical stresses that may be generated during washing or cleaning, something which is not the case with a conventional outer layer made of diffusion-resistant aluminum foil. The mechanical properties are obtained mainly thanks to the plastic layer. Thanks to the outer metal foil layer, the coating material also exhibits extremely high fire resistance.

The coating material is simple and inexpensive to manufacture, and the manufacture may take place in existing equipment with little or no modification. However, the coating material may be applied both on an insulating material on site, in the form of a loosely placed coating material, or applied using heat.

The plastic layer may have a thickness within the 10 to 100 µm or more preferably 20 to 40 µm range.

The plastic layer may consist of PET (polyethylene terephthalate), especially having a thickness within the 10 to 100 µm or more preferably 20 to 40 µm range.

The coating material may include a thermoplastic tie layer which is intended to connect said coating material to said insulation system, the melting point of said thermoplastic tie layer being below the melting point of said plastic layer. Because the melting point is below that of the plastic layer, the plastic layer is not affected and consequently the internal structure of the coating material is not affected either by application of the coating material by using heat.

The thermoplastic tie layer may be in the form of a continuous layer or in the form of a discontinuous layer. The tie layer advantageously consists of LDPE (low-density polyethylene) with a thickness within the 10 to 100 µm and more preferably 20 to 50 µm range.

The coating material may include an internal, second layer made of metal foil, for example an aluminum foil, which has a thickness within the 5 to 30 µm and more preferably 7 to 20 µm range, which metal foil layer is placed between said plastic layer and said thermoplastic tie layer.

The coating material may advantageously have a surface structure provided with embossments. As a variant, only the outer metal foil layer may have such a surface structure. The main object is to provide a surface that reduces the reflection of incident light. Depending on its surface structure, it is also possible to obtain other effects, for example a concertina effect for use in conjunction with a shell for a flexible pipe. Embossment also means that any printing marks are less visible.

The plastic layer and/or the thermoplastic tie layer advantageously contain a fire retardant.

According to one embodiment, the coating material may include a hygroscopic material which is placed adjacent the thermoplastic tie layer. Depending on the configurations of the thermoplastic tie layer, it is possible in this way to absorb the moisture/condensation that may form during use in or on the inside of the surface to which the coating material is applied.

To obtain a curvature effect of the coating material, the included layers may have different stretch tensions. This is advantageous within the context of use for an insulation system with a certain curvature.

According to another aspect of the invention, this relates to an insulation system comprising a coating material as claimed in one of the coating material claims, which insulation system comprises a flap, placed on said coating material and provided for application on a joint between two adjacent insulation systems, or a slit in an insulation system. The flap may have, on one of its faces, a portion provided with adhesive. Such flaps make it easier to obtain satisfactory joints during the fitting operation.

The hygroscopic material, thanks to said flap, may be freely exposed to the surrounding atmosphere in the fitted state of the insulation system. This provides a highly effective evaporation surface for any moisture or condensation that has been absorbed in the hygroscopic material.

The coating material may be applied to the thermally insulating material in such a way that the hygroscopic material is in direct connection with the thermally insulating material. In this way, any moisture/condensation in the insulation system may be simply absorbed and suitably removed to the surrounding atmosphere for the purpose of its evaporation.

BRIEF DESCRIPTION OF THE DRAWINGS

According to the present invention, the insulation system comprising the coating material according to any one of the coating material claims may consist of a pipe shell, a mat or a sheet.

The invention will be described below in greater detail by way of examples with reference to the appended drawings, which illustrate a currently preferred embodiment.

DETAILED DESCRIPTION OF EXEMPLARY EMBODIMENTS

The coating material according to the invention is designed to be applied to a thermally insulating material with the purpose of forming an insulation system for pipes, containers, ventilation ducts and the like. The insulation system may consist, for example, of pipe shells, of mats or of sheets. Application is designed to take place mainly in conjunction with the production of said insulation system and will be described below. The coating material may also, of course, as a person skilled in the art will appreciate, be used in different situations and applied subsequently.

The term "insulation system" means mainly an insulation system comprising a thermally insulating material. Such a material is formed, in a suitable manner, by a conventional thermally insulating material, such as mineral wool, or any other material allowing diffusion. The term "mineral wool" includes glass wool and rock wool, and also corresponding fibrous materials.

Figure 1:
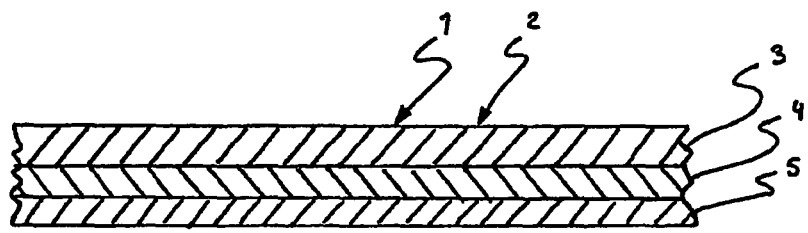
FIG. 1 illustrates a schematic cross-sectional view of a coating material according to a first embodiment of the invention.

FIG. 1 illustrates a schematic cross-sectional view of a coating material 1 according to the simplest embodiment of the invention.

The coating material 1 is made up of a laminate 2, that is to say a plurality of layers joined together. It should be emphasized that all the layers of material of FIG. 1 and of the other figures, for the sake of clarity, have been illustrated with highly exaggerated proportions.

Starting from the outside, that is to say the side intended to be exposed to the environment, the coating material 1 comprises an outer metal foil layer 3, preferably made of aluminum. Other metals or alloys are also possible. The metal foil layer 3 has a thickness within the 20 to 100 μm and more preferably 30 to 60 μm range. One object of this layer is to give the coating material 1 a fire resistance in accordance with the regulations in force in terms of fire resistance, for example an "outer layer of class 1" according to SS 02 48 23/NOR-DTEST-FIRE 004.

Another object of this layer is to constitute a diffusion barrier preventing the penetration of moisture.

The metal foil layer 3 consist of metal, but it may also include any form of reinforcement, for example glass fibers.

The metal foil layer 3, or more preferably the coating material 1 in its entirety, may have an embossed surface structure which increases the mechanical properties while reducing the reflection of incident light. The embossment may for example consist of an irregular pattern, in order to obtain good light refraction, circumferential grooving, in order to allow a concertina effect in order to make it easier, for example, to bend a pipe shell, or a corrugated pattern, in order to allow the interposition of two layers of material placed one against the other. The embossment may, of course, as is known to those skilled in the art, be configured in many different ways while obtaining the same effect.

Inside this layer there is a plastic layer 4, which is preferably made of PET (polyethylene terephthalate).

Advantageously, this layer is placed directly in a position adjacent the outer metal foil layer 3. If the coating material 1 comprises additional layers (not mentioned here), it is essential for the plastic layer 4 to be placed between the outer metal foil layer 3 and the thermoplastic tie layer 5, which will be described later.

The plastic layer 4 has a thickness of 10 to 100 μm and more preferably within the 20 to 40 μm range. By laminating the outer metal foil layer 3 to a plastic layer 4, such as a PET layer, a coating material 1 is obtained that has very good mechanical properties, particularly toughness, giving the material good tear strength and good penetration resistance. The plastic layer 4 consequently should have a tear strength greater than that of the outer metal foil layer 3.

The plastic layer 4 is applied against the metal foil layer 3 by conjoint fusion or adhesive bonding with the latter to form said laminate 2. The conjoint fusion or adhesive bonding gives rise to a coating material 1 having edges that are less sharp than those of a simple metal foil, thereby considerably reducing the risk of an injury by being cut when handling it.

Finally, the coating material 1 illustrated has a thermoplastic tie layer 5, called below a tie layer, which is placed on the plastic layer 4. The tie layer 5 may for example be made of LDPE (low-density polyethylene). This layer may consist of a continuous or a discontinuous film, or it may consist, for example, of a layer that is pressed or sprayed, and melted, against the abovementioned plastic layer 4 in order to form said laminate. The tie layer 5 has, when it is made of LDPE, a thickness within the 10 to 100 μm and more preferably the 20 to 50 μm range.

The material of the tie layer 5 is chosen in such a way that its melting point is below that of the plastic layer 4. This means that the internal structure of the coating material 1 is not affected by the application of heat.

Figure 2:
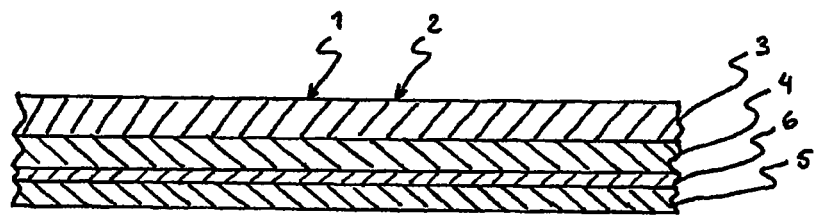
FIG. 2 illustrates a second embodiment of the coating material according to the invention.

FIG. 2 illustrates a second embodiment of the coating material 1 according to the invention. The coating material 1 illustrated is distinguished from that which has just been described by the fact that it has an internal metal foil layer 6 placed between the plastic layer 4 and the tie layer 5. This internal metal foil layer 6 is preferably made of aluminum with a thickness within the 5 to 30 μm and more preferably 7 to 20 μm range. The object of this layer is to cooperate with the plastic layer 4 in order to give the coating material 1 improved mechanical and fire-resistance properties. The internal metal foil layer 6 is laminated by conjoint fusion, or as a variant by means of an adhesive, against the plastic layer 4.

The material layers 3, 4, 5, 6 described above are, as mentioned, placed in the form of a laminate 2 which, during the manufacture of an insulation system, is designed to be applied, through the action of heat and pressure, for example against a thermally insulating material integrated into the insulation system in order to adhere to it in the desired manner. The term "heat" means here a temperature above the melting point of the tie layer in question.

The coating material 1 described above may be handled as a single part in sheet or roll form up to the place of production of the insulation system. The production of the coating material 1 and the insulation system may also be carried out by a continuous process.

Of course, it should be understood that the coating material 1 may also be applied on site, for example in the form of shorter tapes or sheets. This may be applied loosely against the insulation material or it may be applied to the latter by heating. Furthermore, it may be used to seal joints between or slits in successive insulation systems.

For searching purposes, a comparison of a number of mechanical properties was made between a covering material according to the invention, provided with an embossed surface structure, and a material called Isogenopak® having a smooth surface. The laminate tested according to the invention had the following composition starting from the outside, that is to say the external side when considering its use: aluminum foil (40 μm, 108 g/m$^2$); adhesive (3 g/m$^2$); PET (23 μm, 32 g/m$^2$); adhesive (3 g/m$^2$); aluminum foil (9 μm, 24 g/m$^2$); and LDPE (22 g/m$^2$).

The measured values are given in the table below.

| Property | Laminate according to the invention | Isogenopak ® |
|---|---|---|
| Weight per unit area (g/m$^2$) | 201 | 491 |
| Thickness (mm) | 0.32 | 0.33 |
| Tensile strength[1] (kN/m) (1st max.) | 8.1 (parallel to the length of the specimen) | 13.3 (parallel to the length of the specimen) |
| Tensile strength[1] (kN/m) (1st max.) | 8.0 (perpendicular to the length of the specimen) | 12.2 (perpendicular to the length of the specimen) |
| Elongation[1] (%) (1st max.) | 3.6 (parallel to the length of the specimen) | 2.5 (parallel to the length of the specimen) |
| Elongation[1] (%) (1st max.) | 3.1 (perpendicular to the length of the specimen) | 2.5 (perpendicular to the length of the specimen) |
| Elasticity[1] (Δf/ε) (kN/m) | 521 (parallel to the length of the specimen) | 990 (parallel to the length of the specimen) |
| Elasticity[1] (Δf/ε) (kN/m) | 564 (perpendicular to the length of the specimen) | 903 (perpendicular to the length of the specimen) |
| Tear strength[2] (N) | 5.5 (parallel to the length of the specimen) | 15.7 (parallel to the length of the specimen) |
| Tear strength[2] (N) | 5.4 (perpendicular to the length of the specimen) | 15.7 (perpendicular to the length of the specimen) |
| Stamping force [3] (N) | 282 | 824 |
| Failure deformation during stamping[3] (mm) | 17 | 32 |

(1) The tensile test is carried out on test specimens 50 mm in width and having a gage length of 300 mm. The first maximum reached is interpreted as a fracture. The strength is expressed as the force per meter of width. The elasticity is calculated from the tangent to the straight first part of the curve and is expressed as the increase in the force per meter of width and elongation.

(2) The tear strength was measured in accordance with Elmendorf. The equipment is designed for a paper test, which means that the weight of the pendulum is too low. The results are consequently only given for information.

(3) The stamping is carried out with a flat punch having a diameter of 19 mm. The material is held fixed between two rubber-coated steel rings with an open inside diameter of 125 mm. The speed of deformation is 5 mm/min.

The measurements given in the table were taken on materials of the same thickness, but in this case the weight per unit area of the Isogenopak® product was more than twice as high. Although the Isogenopak® measurement values are almost twice as high, the tested material according to the invention has mechanical properties such that it meets the desired criteria for the invention, namely it withstands the stresses which are applied and which are expected during the fitting and maintenance operations and in normal use of the insulation system. It should be noted that the coating material according to the invention is mainly designed to be used in applied form fixed against an insulation, unlike Isogenopak®, or even unlike a Stucco sheet, which is designed to be applied in the form of a loose covering. The fixed application means that the insulation system without its assembly exhibits better mechanical properties than the corresponding insulating system having an Isogenopak® or Stucco sheet covering.

The coating material tested meets the "surface layer of class 1" requirement in accordance with SS 02 48 23/NORDTEST-FIRE 004.

A coating material 1 comprising a number of layers has been described above. Such coating materials 1 are produced in a suitable manner so that the layers contained in the material are applied against one another in the form of a continuous ply of material, applying pressure and heat simultaneously, after which the finished coating material is rolled up onto a roll for the purpose of subsequently transporting it to the desired place, for example for producing an insulation system. To create a "memory" or a curvature effect in the coating material, so that it is endeavored for example to obtain a conjoint winding with a certain radius of curvature, it may be advantageous for the plies of material integrated into the laminate to have different stretch tensions. This may be advantageous during production of pipe shells or of sections with a radius of curvature. In a pipe shell with a sealing flap, this type of "memory" may be highly advantageous insofar as the coating material, and with it the flap, has a tendency to be applied against the outer surface of the pipe shell instead of moving away from its outer surface. The "memory" consequently reduces the possible tensile stresses in a joint provided with an adhesive, thereby making the joint more reliable and durable.

Figure 3:
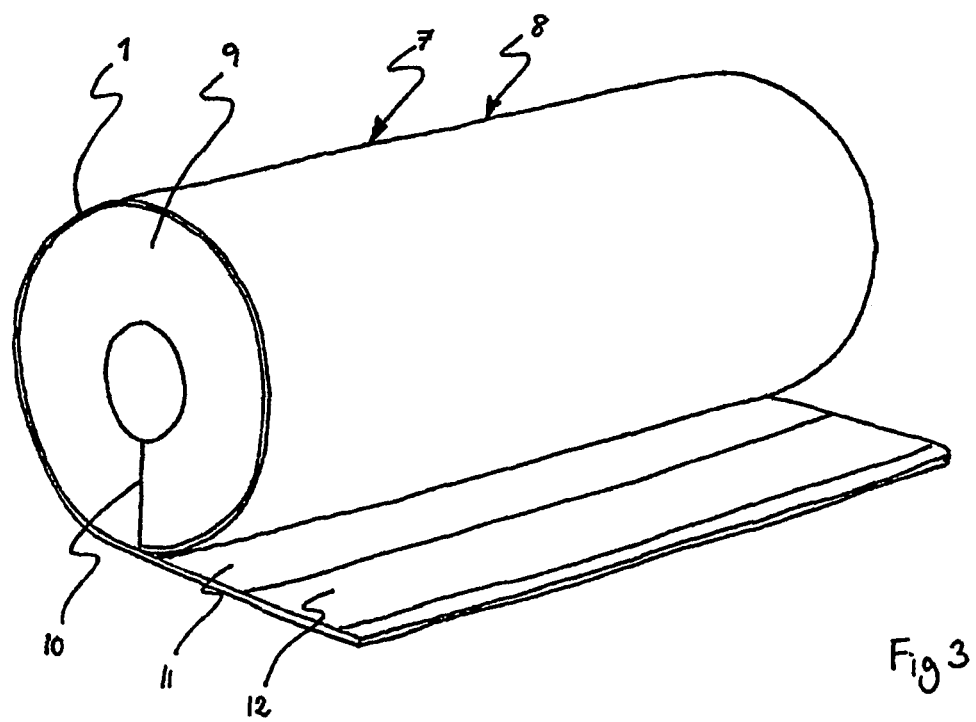
FIG. 3 illustrates schematically an insulation system in the form of a pipe shell, with the coating material according to the invention.

FIG. 3 illustrates schematically an insulation system 7 in the form of a pipe shell 8 with a coating material 1 in accordance with the abovementioned first embodiment of the invention. The pipe shell 8 comprises a thermally insulating material 9 with a longitudinal transverse slit 10, which makes it easier to mount the pipe shell 8. A portion of coating material 1 has been applied, on top of the thermally insulating material 9, along the circumference by application of pressure and heat. The coating material 1 has been thermally bonded to the thermally insulating material 9 during this application.

The coating material 1 may, as indicated, have a width such that it envelopes, right around the circumference, the pipe shell by more than 360°, that is to say the coating material 1 forms a flap 11. The flap 11 has a longitudinal adhesive portion 12 with a protective film for sealing the slit 10 in the pipe shell 8. During the fitting operation, the pipe shell 8 is intended to be forced, by means of the slit 10, over the pipe that has to be insulated, after which the slit 10 is sealed by bringing the flap 11 and its adhesive portion 12 so as to adhere to the outer surface of the pipe shell.

Experiments carried out with such an insulation system 7 have shown that, owing to the thickness on the outer metal foil layer 3 which, in the test, consisted of 40 μm of pure aluminum, this met the requirement stipulated in the Swedish fire protection regulation for a "surface layer of class 1" according to SS 02 48 23/NORDTEST-FIRE 004. Furthermore, the coating material 1 has, owing to the combination of the metal foil layer 3 and the plastic layer 4, satisfactory mechanical properties for withstanding the external stresses commonly experienced during the fitting operation and normal use during its lifetime, and during maintenance. Consequently, there is no need for a separate aluminum or plastic protective covering, and thus the fitting operation is very simple, quick and reliable. The combination of the outer metal foil layer 3 and the plastic layer 4 means that the coating material 1 has a structure such that, at its cut/polished edges, there is no real risk of an injury by being cut when handling the insulation element 7.

Unlike the prior art, what is consequently obtained, by means of the coating material 1 according to the invention, is a one-piece insulation system 7 which meets all the parameters that can be obtained with the conventional technique only by combining the insulation system 7 with a separate plastic or metal covering. The insulation system 7 comprising the coating material 1 according to the invention may be manufactured in the same way as a conventional coating material, which comprises a thin pure aluminum foil, with or without reinforcement. The manufacture both of the coating material and of the insulation system 7 may also be carried out on existing equipment.

A corresponding technique may of course be used for the insulation system 7 with a design other than a pipe shell, for example in the form of a mat or panel. In this case, the coating material 1 may of course be placed with a larger surface area than the thermally insulating material 9, thereby forming peripheral flaps with or without an adhesive portion provided with a protective film.

An insulation system 7 according to the invention may also be combined with a hygroscopic material (not illustrated) in order to expel any condensation that may form in or penetrate into the insulation system during use. The hygroscopic material may be placed in the form of a layer in said coating material, or in the form of a separate layer. The term "hygroscopic material" is understood here to mean a material that is capable of absorbing and transporting vapor and water and of delivering the vapor depending on the humidity of the surrounding atmosphere, so as to try to achieve equilibrium. The hygroscopic material may be composed of a series of different materials such as, for example, glass fiber, wood, paper, active clay, aluminum silicate or silica gel. The hygroscopic material may also be composed of a thermoplastic, such as polyester or nylon.

The hygroscopic material may be placed in various ways in an insulation system. In the case in which it is incorporated into the coating material, it should at least be partly in connection with the thermally insulating material. This may be achieved by placing it, for example, between a discontinuous thermoplastic tie layer and the plastic layer.

It should be understood that the present invention is not limited to the embodiments of the coating material according to the invention that have been illustrated and described. Many modifications and alternative embodiments are thus possible and the invention is consequently defined exclusively by the appended claims.

The invention claimed is:

1. A coating material in laminate form for an insulation system for installation elements including pipes, containers, and ventilation ducts, the coating material comprising, in order:
   a first layer comprising a first metal foil;
   a second layer comprising a plastic material;
   a third layer comprising a second metal foil; and
   a fourth layer comprising a thermoplastic tie material for connecting the coating material to a thermally insulating material of the insulation system;
   wherein:
   the first metal foil has a thickness of from 20 to 100 µm;
   the second metal foil has a thickness of from 5 to 30 µm; and
   the thermoplastic tie material has a lower melting point than the plastic material.

2. The coating material as claimed in claim 1, wherein the second layer has a thickness of from 10 to 100 µm.

3. The coating material as claimed in claim 1, wherein the plastic material comprises PET.

4. The coating material as claimed in claim 1, wherein the fourth layer is a continuous layer.

5. The coating material as claimed in claim 1, wherein the fourth layer is a discontinuous layer.

6. The coating material as claimed in claim 1, wherein:
   the thermoplastic tie material comprises LDPE; and
   the fourth layer has a thickness of from 10 to 100 µm.

7. The coating material as claimed in claim 1, wherein a surface of the coating material is provided with embossments.

8. The coating material as claimed in claim 1, wherein the second layer comprises a fire retardant.

9. The coating material as claimed in claim 1, wherein the fourth layer comprises a fire retardant.

10. The coating material as claimed in claim 1, further comprising a fifth layer comprising a hygroscopic material;
    wherein the fifth layer is adjacent to the fourth layer.

11. The coating material as claimed in claim 1, wherein at least two of the layers of the coating material have different stretch tensions.

12. A method, comprising attaching the coating material as claimed in claim 1 to a thermally insulating material.

13. An insulation system for installation elements including pipes, containers, and ventilation ducts, the insulation system comprising:
    an thermally insulating material; and
    a coating material provided on a surface of the thermally insulating material;
    wherein:
    the coating material comprises, in order:
       a first layer comprising a first metal foil;
       a second layer comprising a plastic material;
       a third layer comprising a second metal foil; and
       a fourth layer comprising a thermoplastic tie material for connecting the coating material to the thermally insulating material;
    the first metal foil has a thickness of from 20 to 100 µm;
    the second metal foil has a thickness of from 5 to 30 µm;
    the thermoplastic tie material has a lower melting point than the plastic material; and
    at least a portion of the coating material extends beyond an edge of the thermally insulating material to form a flap for joining edges of the insulation system adjacent to a slit or for joining the insulation system to an adjacent insulation system.

14. The insulation system as claimed in claim 13, wherein an adhesive is provided on at least one portion of the flap.

15. The insulation system as claimed in claim 13, wherein:
    the coating material further comprises a fifth layer comprising a hygroscopic material;
    the fifth layer is adjacent to the fourth layer; and
    when the insulating material is installed, the hygroscopic material is exposed to the atmosphere at the flap.

16. The insulation system as claimed in claim 13, wherein the insulation system is in the form of a pipe shell, a mat, or a panel.

17. The insulation system as claimed in claim 13, wherein the coating material is loosely attached to the thermally insulating material.

18. A method, comprising applying the insulation system as claimed in claim 13 as insulation for a pipe.

19. A laminate consisting of:
    a first layer consisting of a first metal foil;
    a second layer in contact with the first layer, the second layer consisting of a plastic material;
    a third layer in contact with the second layer, the third layer consisting of a second metal foil;
    a fourth layer in contact with the third layer, the fourth layer consisting of a thermoplastic tie material; and
    a thermally insulating material in contact with the fourth layer;
    wherein:
    the first metal foil has a thickness of from 20 to 100 µm;
    the second metal foil has a thickness of from 5 to 30 µm; and
    the thermoplastic tie material has a lower melting point than the plastic material.

20. An insulation system for installation elements including pipes, containers, and ventilation ducts, the insulation system comprising:
    an thermally insulating material; and
    a coating material provided on a surface of the thermally insulating material;
    wherein:
    the coating material consists of:
       a first layer consisting of a first metal foil;
       a second layer in contact with the first layer, the second layer consisting of a plastic material;
       a third layer in contact with the second layer, the third layer consisting of a second metal foil; and
       a fourth layer in contact with the third layer, the fourth layer consisting of a thermoplastic tie material;
    the fourth layer is in contact with the thermally insulating material;
    the first metal foil has a thickness of from 20 to 100 µm;
    the second metal foil has a thickness of from 5 to 30 µm;
    the thermoplastic tie material has a lower melting point than the plastic material; and
    at least a portion of the coating material extends beyond an edge of the thermally insulating material to form a flap for joining edges of the insulation system adjacent to a slit or for joining the insulation system to an adjacent insulation system.

21. A laminate, comprising:
a first layer consisting of a first metal foil;
a second layer in contact with the first layer, the second layer consisting of a plastic material;
a third layer in contact with the second layer, the third layer consisting of a second metal foil;
a fourth layer in contact with the third layer, the fourth layer consisting of a thermoplastic tie material for connecting the coating material to a thermally insulating material of the insulation system; and
a thermally insulating material in contact with the fourth layer;
wherein:
the first metal foil has a thickness of from 20 to 100 μm;
the second metal foil has a thickness of from 5 to 30 μm; and
the thermoplastic tie material has a lower melting point than the plastic material.

22. An insulation system for installation elements including pipes, containers, and ventilation ducts, the insulation system comprising:
an thermally insulating material; and
a coating material provided on a surface of the thermally insulating material;
wherein:
the coating material comprises, in order:
a first layer comprising a first metal foil;
a second layer comprising a plastic material;
a third layer comprising a second metal foil; and
a fourth layer comprising a thermoplastic tie material;
the fourth layer is in contact with the thermally insulating material;
the first metal foil has a thickness of from 20 to 100 μm;
the second metal foil has a thickness of from 5 to 30 μm; and
the thermoplastic tie material has a lower melting point than the plastic material.

* * * * *